(12) United States Patent
Ballenger et al.

(10) Patent No.: US 12,254,469 B2
(45) Date of Patent: Mar. 18, 2025

(54) BROWSER TOOL AND APPLICATION FOR PROVIDING AN EXACT AMOUNT TRANSACTION FUNDING SOURCE

(71) Applicant: PAYPAL, INC., San Jose, CA (US)

(72) Inventors: Taylor Charles Ballenger, Los Angeles, CA (US); Konstantinos Sgoutas, Los Angeles, CA (US); Matthew Essenburg, Glendale, CA (US)

(73) Assignee: PAYPAL, INC., San Jose, CA (US)

( * ) Notice: Subject to any disclaimer, the term of this patent is extended or adjusted under 35 U.S.C. 154(b) by 4 days.

(21) Appl. No.: 18/296,323

(22) Filed: Apr. 5, 2023

(65) Prior Publication Data

US 2023/0281616 A1  Sep. 7, 2023

Related U.S. Application Data

(63) Continuation of application No. 17/222,880, filed on Apr. 5, 2021, now Pat. No. 11,657,394.

(51) Int. Cl.
*G06Q 30/02* (2023.01)
*G06F 9/445* (2018.01)
(Continued)

(52) U.S. Cl.
CPC ....... *G06Q 20/387* (2013.01); *G06F 9/44526* (2013.01); *G06F 16/986* (2019.01);
(Continued)

(58) Field of Classification Search
CPC .. G06Q 20/387; G06Q 20/322; G06Q 20/342; G06Q 30/0222; G06Q 30/0239; G06Q 20/326; G06F 9/44526
See application file for complete search history.

(56) References Cited

U.S. PATENT DOCUMENTS

| | | | |
|---|---|---|---|
| 2014/0052617 A1* | 2/2014 | Chawla | G06Q 20/102 705/39 |
| 2014/0114755 A1* | 4/2014 | Mezzacca | G06Q 30/0253 705/14.51 |

(Continued)

OTHER PUBLICATIONS

"Fluz App: Buy Exact-Value Gift Cards at a Discount" (Chuck; published on Feb. 4, 2021 at https://www.doctorofcredit.com/fluz-app-buy-exact-value-gift-cards-at-a-discount/) (Year: 2021).*

(Continued)

*Primary Examiner* — James M Detweiler
(74) *Attorney, Agent, or Firm* — Haynes and Boone, LLP

(57) ABSTRACT

There are provided systems and methods for a browser tool and application for providing an exact amount transaction funding source or gift card. A digital gift card may be generated for an exact amount by detecting a checkout total is finalized on a merchant website having a checkout process. This may be done using a computing script that parses a DOM tree for the website and identifies webpage elements to monitor. By monitoring the webpage elements, a checkout total may be detected. This may occur by detecting when input and elements are finalized and present within one or more webpage fields, such as by monitoring HTML or XML code snippets A gift card network may be used to offer an exact amount gift card to a user to be used for full payment of the transaction.

20 Claims, 8 Drawing Sheets

(51) Int. Cl.
    *G06F 16/958*     (2019.01)
    *G06Q 20/32*     (2012.01)
    *G06Q 20/34*     (2012.01)
    *G06Q 20/38*     (2012.01)
    *G06Q 30/0207*     (2023.01)

(52) U.S. Cl.
    CPC ......... *G06Q 20/322* (2013.01); *G06Q 20/342* (2013.01); *G06Q 30/0222* (2013.01); *G06Q 30/0239* (2013.01); *G06Q 20/326* (2020.05)

(56) References Cited

U.S. PATENT DOCUMENTS

| | | | |
|---|---|---|---|
| 2015/0134439 A1 | 5/2015 | Maxwell et al. | |
| 2016/0027103 A1* | 1/2016 | Benamour | G06Q 40/10 705/35 |
| 2017/0186027 A1* | 6/2017 | Hudson | G06Q 30/0238 |
| 2018/0012206 A1* | 1/2018 | Sood | G07F 7/025 |
| 2018/0315041 A1* | 11/2018 | Wynn | G06Q 30/0601 |
| 2020/0082425 A1* | 3/2020 | Corrieri | G06Q 20/405 |
| 2020/0327534 A1* | 10/2020 | Swanson | G06Q 30/0641 |
| 2021/0216999 A1 | 7/2021 | Pronski et al. | |

OTHER PUBLICATIONS

"Save Money Wherever You Are with CrayPay!" (DDG; published on Jan. 11, 2018 at https://milestomemories.com/craypay-app/); (Year: 2018).*

"Save Money Wherever You Are with CrayPay!", Retrieved from Internet URL: https://milestomemories.com/craypay-app/, Retrieved on Jan. 11, 2018, 2 pages.

"Fluz App: Buy Exact-Value Gift Cards at a Discount," Retrieved from Internet URL: https://www.doctorofcredit.com/fluz-app-buy-exact-value-gift-cards-at-a-discount/, Retrieved on Feb. 4, 2021, 4 pages.

* cited by examiner

BROWSER TOOL AND APPLICATION FOR PROVIDING AN EXACT AMOUNT TRANSACTION FUNDING SOURCE

CROSS-REFERENCE TO RELATED APPLICATIONS

This application claims priority to and is a continuation of U.S. patent application Ser. No. 17/222,880, filed Apr. 5, 2021, all of which is incorporated herein by reference in its entirety.

TECHNICAL FIELD

The present application generally relates to autonomous browser tools that perform webpage element monitoring and more particularly to monitoring webpage elements in a document object model (DOM) tree hierarchy and providing exact amount funding sources based on detection of final checkout data.

BACKGROUND

Users may utilize online transaction processors for processing transactions between different entities through device applications and digital accounts. Further, these online transaction processors or other service providers may provide different data platforms that users may interact with to utilize computational services. When a user attempts to electronically process a transaction using an online transaction processor, a digital transaction may be generated through a web browser and corresponding website of a merchant. The merchant may provide digital checkout services, where items may be added to a digital shopping cart and a total may be calculated based on items, shipping, tax, and other required costs. Thereafter, the user may checkout by utilizing the online transaction processor's computing services and platforms.

The online transaction processor may provide for different payment options, discounts and other cost savings to be applied. For example, digital gift cards, which may be purchased at reduced costs, may be used to pay for transactions. Since most transaction totals are odd amounts (i.e., are of varying dollars and cents, e.g., $73.47), and gift cards in a normal context are sold in specific incremental amounts (e.g., $5, $10, $25, $50, $100), a purchaser typically cannot purchase gift cards for the exact amount of the total, and thus will either have to buy some amount more or less than the total. This leaves the purchaser in the position of either not maximizing savings (by buying gift cards that total less than the transaction amount), or having some additional value left over on the gift card (by buying gift cards that total more than the transaction amount) which may end up never being used by the purchaser. Thus, it is desirable for online transaction processors to more accurately detect when a transaction total is finalized, and to provide improved electronic transaction processing services over a network by facilitating the purchase of gift cards of exact amounts matching the transaction total.

BRIEF DESCRIPTION OF THE DRAWINGS

FIG. 2A is an exemplary user interface displaying a merchant website during a digital checkout for a transaction, according to an embodiment;

FIG. 2C is an exemplary user interface displaying a merchant website during a digital checkout for a transaction that is processed using an exact amount digital gift card, according to an embodiment;

Figure 1:
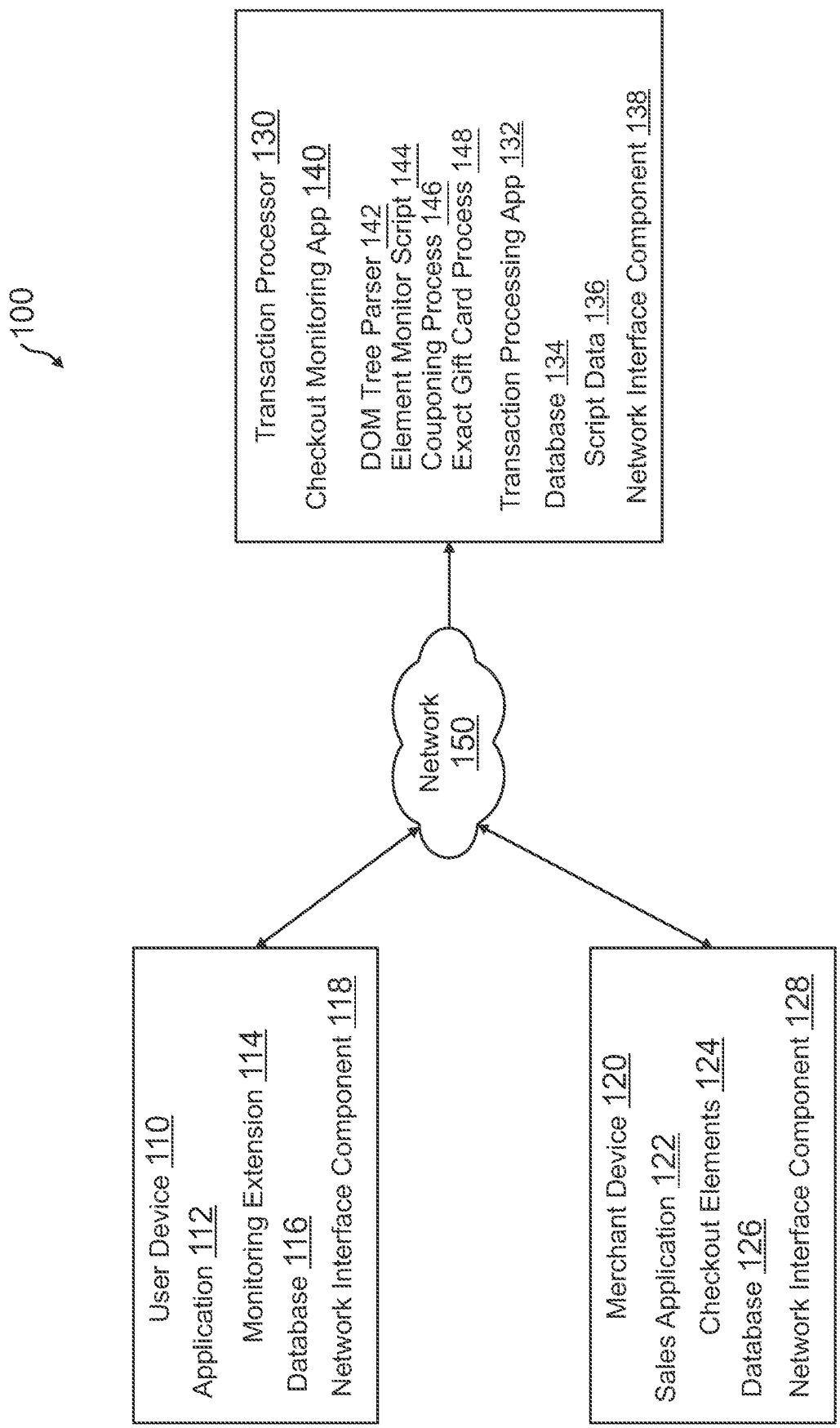
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a browser tool and application for detecting final checkout data and generating and providing exact amount funding sources, such as gift cards, for use in completing a transaction. Systems suitable for practicing methods of the present disclosure are also provided.

A user may utilize a payment card, account, and/or digital wallet to process payments through an electronic card or transaction network associated with an online transaction processor or other service provider. A digital account of the user with an online transaction processor or other service provider (e.g., PAYPAL®, VENMO®, etc.) may provide electronic transaction processing services to users on one or more merchant websites. Further, the transaction processor may provide additional services through the account, including those for discounts, benefits, loyalty, and other cost savings when checking out and paying for transactions electronically on the merchant websites. In this regard, the transaction processor may provide a browser tool, add-on, extension, or the like, as well as a resident dedicated application (e.g., mobile application), that may monitor webpage elements on webpages of a merchant website for a merchant. The operations of the browser extension and/or application may monitor for when final checkout total for a transaction is available via the webpage elements on one or more checkout webpages of the merchant website.

Once this total is finalized, the transaction processor may determine if one or more electronic funding sources are available for the user to use with the merchant, which may provide a discounted total over the transaction total. In one embodiment, the electronic funding sources include digital gift cards, gift card values, and/or gift card options. For example, a digital gift card may be purchased for the merchant and usable on the merchant website for a discount, such as $5 off a $100 gift card purchase, 10% savings on gift card purchases, or other percentage or flat value savings. This may be available from an integration of the transaction processor with the merchant for digital gift card sales and purchases (including discounts) or may be available with third-party gift card networks and sellers. If a digital gift card is available, and for an amount associated with the total (e.g., an exact amount gift card for the total of the transaction), then the transaction processor may utilize a window, pop-up, or other interface output to display an option to purchase the digital gift card for application to the transaction's total. The user may request to purchase the digital gift card, which may cause the transaction processor to utilize backend computing services to process a gift card transaction to purchase the digital gift card. The transaction processor may then populate information for the digital gift card in one or more interface outputs or displays, as well as apply the digital gift card to the transaction's total. Although gift cards are described herein, other types of funded payment sources may also be utilized and provide similar benefits, as described herein. For example, limited funding credit or debit cards may also be utilized for the processes described herein (e.g., VISA® credit cards funded by a payment amount and usable at multiple merchants).

For example, a user may wish to process a purchase of one or more items in a transaction, as well as a gift card offer extended to the user via an online transaction processor during a transaction. Selection of one or more items and/or digital gift cards during an online transaction with a merchant website may require a payment instrument from the user for electronic transaction processing. A user may pay for one or more transactions using a digital wallet or other account with an online service provider or transaction processor (e.g., PayPal®), as well as the payment card (e.g., through proffering the physical card and reading card data or by entering card details and/or account numbers). An account and/or corresponding payment card with a service provider may be established by providing account details, such as a login, password (or other authentication credential, such as a biometric fingerprint, retinal scan, etc.), and other account creation details. The account creation details may include identification information to establish the account, such as personal information for a user, business or merchant information for an entity, or other types of identification information including a name, address, and/or other information.

The user may also be required to provide financial information, including payment card (e.g., credit/debit card) information, bank account information, gift card information, benefits/incentives, and/or financial investments, which may be used to process transactions for items and digital gift cards (e.g., exact amount digital gift cards for detected transaction totals). However, in other embodiments, the account creation may be used to establish account funds and/or values, such as by transferring money into the account and/or establishing a credit limit and corresponding credit value that is available to the account and/or card. The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and the other transaction processing services.

Once the account of the user is established with the service provider, the user may utilize the account via one or more computing devices, such as a personal computer, tablet computer, mobile smart phone, or the like. The user may engage in one or more online or virtual interactions, such as browsing websites and data available with websites of merchants. The transaction processor may track the data over a plurality of visited websites, online resources, and/or applications, for example, using an application plugin, an application extension, or an application add-on, as well as mobile applications and other resident device applications, provided by a digital platform associated with the transaction processor (e.g., HONEY® or another browser add-on). The transaction processor may therefore determine transaction data on a merchant website based on interactions the user performs through their computing device with the merchant website. The transaction processor may track this data through one or more application programming interface (API) integrations between different applications, microservices, decision services, and/or digital platforms of the transaction processor's system. The API integrations may allow for API calls and requests to be executed to track, request, and/or receive data from different platforms and operations of those platforms with merchant websites.

Using a browser extension (e.g., for a web browser that accesses merchant websites) and/or a resident dedicated application (e.g., a mobile application that provides webviews for webpages accessed within the application), the online transaction processor or other service provider may detect when a checkout total for a transaction is finalized on a merchant website. Initially, the transaction processor may map the merchant webpages making up the merchant website and/or checkout operations on the merchant website. The transaction processor may map the webpages by determining a domain object model (DOM) tree, structure, or other hierarchy for the merchant website and/or checkout webpages and sub-pages. The transaction processor may parse through the DOM tree and determine the webpage elements, fields, menus, and the like as hypertext markup language (HTML) and/or extensible markup language (XML) code snippets. Using these elements, the transaction processor may determine which are present and have data corresponding to a final checkout total during electronic transaction processing on the merchant webpage. For example, the webpage elements may correspond to fields for shipping information, billing information, item confirmation, shipping cost, tax, tip, and the like. Further, one or more HTML snippets may be required to be present and/or processed (e.g., a code snippet for calculating tax, shipping, and the like) for the checkout total to be finalized and completed on the merchant website.

Thereafter, the transaction processor may generate a text monitoring and/or webpage parsing script that monitors the corresponding webpage elements that are required and/or have input or calculated data for a checkout total to be finalized. For example, a Vi Improved (VIM) text editor software or application may be used to generate a script that allows for a browser extension and/or application to parse a webpage's elements from a DOM tree and monitor those elements for a checkout total during a digital checkout process on the merchant website. As each merchant website may function differently and have different code and elements, a script may be generated for each merchant website and/or checkout process on the merchant website. Thus, the script may be particular to a uniform resource identifier (URI) or uniform resource locator (URL). However, certain merchant websites may share the same or similar functionality, such as when a checkout process is deployed and included in the merchant website by another service provider. For example, a third party online transaction processor may provide the same or similar software development kits (SDKs) to program checkout processes on different merchant websites. Once the script is coded and generated for the merchant website, it may be deployed with the browser extension and/or application that accesses merchant websites and provides webviews of websites. To deploy the script, the script may be passed as a Javascript set to the extension or application. In some embodiments, this may occur when navigation to a URI or URL of a merchant website having a corresponding script is detected.

The extension and/or application may detect a navigation to a merchant website and/or digital checkout process, such as through entry and/or navigation to a specific URL or URI. Thereafter, the script may be executed to monitor webpage elements and HTML or XML code snippets on the merchant website and/or checkout process. The script may be executed by parsing the DOM tree of the website and determining which elements are to be monitored based on the previously designated elements and code snippets requiring monitoring by the script. The script may then monitor these elements and code snippets to detect when the elements and code snippets are present and when input or data is provided to those elements or code snippets. When present, and when input or data is detected from the monitoring, the script may determine that a checkout total for a transaction has been finalized and completed, such as when the user is ready to checkout and pay for a final total for a transaction. This may include determining that the merchant website has a shipping address, billing address, item total, tax, shipping cost, tip, and/or any other data required to be present for the merchant website to calculate the final total and apply to the transaction. In various embodiments, the transaction processor may do this by executing a Javascript set with the script in order to pass monitoring instructions for a subset of elements and/or code snippets of the DOM tree that are selected for monitoring.

In various embodiments, prior to finalizing a transaction total for a transaction, the extension and/or application may determine coupons, discounts, rebates, loyalty rewards, and other savings that may be applied to the transaction, which affect the transaction total. This may be done based on a data repository and/or third-party integrations with couponing and/or discount systems. Thus, the additional savings may correspond to digital coupons, codes, and the like that may be entered to one or more checkout fields on the merchant website. The extension or application may automatically apply these savings to the digital transaction by passing program code, entering alphanumeric codes, or otherwise automatically applying the savings to the transaction, thereby reducing the final total. Further, the user may be queried through an application interface, popup notification, push notification, or the like of the savings that can be applied, and whether to apply the savings. When applying the savings, the script for the extension or application may go in a series based on the program code to first apply savings and then determine the final total for an exact amount digital gift card. This may be done through injecting Javascript code to the script in order to identify the data and field for the coupons on the merchant website and when to apply both the savings and the exact amount digital gift card, as further discussed herein.

Further, the online transaction processor may determine whether the coupons and/or savings are available to be applied when used in conjunction with a digital gift card for payment of a transaction. For example, some coupons may apply only when used with a credit card or other payment method, but not with gift cards. Other coupons may require a transaction minimum, where application of another coupon may reduce a transaction total under this minimum. Thus, the transaction processor may intelligently select the coupons so that the coupons can be applied to the transaction total when a digital gift card is used to pay for the transaction. Thereafter, once the coupons are applied, the script may then monitor and check the webpage elements and code snippets to detect whether a checkout total is finalized. This may include determining all required input or data is provided in webpage fields and/or menus. Thereafter, a final total is determined for all costs and detected by the script.

The online transaction processor may then determine a gift card value for the transaction total (e.g., an exact amount) or a maximum gift card that can be purchased from the merchant and/or by the online transaction processor. The transaction processor may determine the gift card value and potential savings from integrations with the merchant and/or merchant systems (e.g., an online platform or merchant website with the merchant that allows for purchasing of gift cards). The transaction processor may also determine the gift card value from third-party vendors and other gift card networks that may sell gift cards to users and other systems (e.g., the transaction processor for exact amount digital gift cards). The gift card value may be for the transaction total but may cost less than the transaction total, such as a 10% savings from the transaction total or $5 off for a purchase of a gift card value. In some embodiments, the transaction processor, browser extension, and/or device application may be limited to a cap on digital gift cards, such as $500, where a maximum amount for the gift card may be limited under the transaction total.

Once the gift card value is determined, an output may be generated to be displayed with the checkout process on the merchant website. The output may correspond to a popup or push notification, which may be displayed on or with the website (e.g., by the browser extension) and/or in the device application. Other interface elements or windows may also be displayed. The output may include a process to view the gift card value, the savings from purchasing the gift card and/or a cost of the gift card, and a process to purchase the gift card for the cost. The process may allow use of an account of the user with the transaction processor to purchase the gift card, such as through a credit/debit card associated with the account, stored value for the account, and/or other financial instrument or asset for the account. If purchased, the transaction processor may process and complete a transaction to purchase a digital gift card for the gift card value, for example, using the merchant or third-party gift card purchasing services. The digital gift card, including the card number, personal identification number (PIN) for authorization of the card, card verification value (CVV), or other numbers required to be used to redeem the gift card value and/or apply the digital gift card to the transaction total. The digital gift card's information may be displayed in an interface output, window, or element so that the user may apply to the digital gift card to the transaction. Further, the online transaction processor may automatically insert the gift card information to a webpage field, element, or webpage coded section via the extension and/or application. This allows for the digital gift card to be applied to the transaction during checkout processing. Where the gift card is an exact value, the transaction may then be processed using the full gift card value. However, if a balance remains (e.g., if transaction is more than a maximum available for a digital gift card), the user may be required to further provide payment for the transaction.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways, and that the operations performed, and/or the services provided by such devices and/or servers, may be combined or separated for a given embodiment and may be performed by a greater number or fewer number of devices and/or servers. One or more devices and/or servers may be operated and/or maintained by the same or different entities.

System 100 includes a user device 110, merchant device 120, and a transaction processor 130 in communication over a network 150. User device 110 may be used to process payments, such as through a payments platform, application, and/or application extension, which may be facilitated through digital accounts and processing operations of transaction processor 130. User device 110 may detect when a checkout total is finalized and ready for payment for a transaction with merchant device 120. Transaction processor 130 may determine an exact amount gift card, which may be provided to user device 110 for processing with the gift card when the checkout total is finalized.

User device 110, merchant device 120, and transaction processor 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

User device 110 may be implemented using any appropriate hardware and software configured for wired and/or wireless communication with merchant device 120 and/or transaction processor 130 for processing payments and transactions. User device 110 may correspond to an individual user, consumer, or merchant that utilizes a peer-to-peer payment network and platform provided by transaction processor 130 to process those payments. In various embodiments, user device 110 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing device may function similarly.

User device 110 of FIG. 1 contains an application 112, a database 116, and a network interface component 118. Application 112 may correspond to executable processes, procedures, and/or applications with associated hardware. In other embodiments, user device 110 may include additional or different software as required.

Application 112 may correspond to one or more processes to execute modules and associated devices of user device 110 to provide a convenient interface to permit a user for user device 110 to enter, view, and/or process items the user wishes to purchase in a transaction, as well as purchase exact amount gift cards when a checkout total is finalized. In this regard, application 112 may correspond to specialized hardware and/or software utilized by user device 110 that may provide transaction processing for the items, such as through a user interface enabling the user to enter and/or view the items that the user associated with user device 110 wishes to purchase. This may be based on a transaction generated by application 112 using a merchant website provided by merchant device 120. Application 112 may also be used by a user to provide payments and transfers to a second user or merchant associated with merchant device 120. For example, application 112 may utilize user financial information, such as credit card data, bank account data, or other funding source data, as a payment instrument when providing payment information. Additionally, application 112 may utilize a digital wallet associated with an account with transaction processor 130 as the payment instrument, for example, through accessing a digital wallet or account of a user through entry of authentication credentials and/or by providing a data token that allows for processing using the account. Application 112 may also be used to receive a receipt or other information based on transaction processing.

In various embodiments, application 112 may correspond to a general browser application configured to retrieve, present, and communicate information over the Internet (e.g., utilize resources on the World Wide Web) or a private network. For example, application 112 may provide a web browser, which may send and receive information over network 150, including retrieving website information, presenting the website information to the user, and/or communicating information to the website, including payment information for the transaction. However, in other embodiments, application 112 may include a dedicated application of transaction processor 130 or other entity (e.g., a merchant), which may be configured to assist in processing transactions electronically, such as a mobile application on a mobile device. Application 112 may include a data tracker used to track data for a user associated with user device 110 when the user interacts with different online platforms and entities including merchants and marketplaces. The data tracker may correspond to an operation of application 112 and/or an application or browser extension, add-on, or plug-in. This extension may include operations to parse, monitor, and track checkout data on a merchant website in order to determine when a checkout total is finalized and ready for payment in order to offer an exact amount digital gift card for purchase.

For example, a Javascript set may be passed by transaction processor 130 to application 112 that corresponds to a monitoring extension 114 for a merchant website visited by application 112. The merchant website may include a checkout process and processing flow (e.g., flow of computing operations to perform a checkout), where the script of monitoring extension 114 may be specifically tailored to the merchant website and/or checkout process. Where the checkout process is shared between different merchant websites, the script may be used for multiple merchant websites. Thereafter, the monitoring extension 114 (e.g., browser extension and/or monitoring process) of application 112 may then use the script to parse a domain object model (DOM) tree, identify webpage elements and HTML or XML code snippets designated for monitoring, and monitor those elements. When a checkout total is identified from the checkout process by monitoring extension 114, transaction processor 130 may be queried with the final checkout total so that an exact amount gift card may be provided with the merchant website in application 112. Application 112 may provide a window, interface, or other application field/element that allows for processing of a transaction to purchase the digital gift card for use with the transaction on the merchant website.

User device 110 may further include database 116 which may include, for example, identifiers such as operating system registry entries, cookies associated with application 112 and/or other applications, identifiers associated with hardware of user device 110, or other appropriate identifiers. Identifiers in database 116 may be used by a payment/service provider to associate user device 110 with a particular account maintained by the payment/service provider. Database 116 may also further store received transaction data, as well as processed transaction data. In various embodiments, a script for monitoring extension 114 and other data to monitor webpage elements and code snippets may be stored by database 116.

User device 110 includes at least one network interface component 118 adapted to communicate with merchant device 120 and/or transaction processor 130 over network 150. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Merchant device 120 may be implemented as a communication device that may utilize appropriate hardware and software configured for wired and/or wireless communication with user device 110 and/or transaction processor 130 to provide a merchant website for sales and electronic transaction processing. Merchant device 120 may correspond to a personal computing device for a merchant, for example, a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. In other embodiments, merchant device 120 may correspond to a server, such as a stand-alone or enterprise-class servers, operating an OS such as a MICROSOFT® OS, a UNIX® OS, a LINUX® OS, or another suitable server-based OS. In one example, merchant device 120 may correspond to a device of a merchant that utilizes PAYPAL®, Inc. of San Jose, CA, USA for transaction processing. However, in other embodiments, merchant device 120 may be maintained by another type of entity. Although only one device is shown, a plurality of devices and/or servers may function similarly and/or be connected to provide the functionalities described herein.

Merchant device 120 of FIG. 1 contains a sales application 122, a database 126, and a network interface component 128. Sales application 122 may correspond to executable processes, procedures, and/or applications with associated hardware. In other embodiments, merchant device 120 may include additional or different modules having specialized hardware and/or software as required.

Sales application 122 may correspond to one or more processes to execute software using associated hardware components of merchant device 120 to provide features, services, and other operations for a merchant, seller, administrator, team, or the like associated with merchant device 120 to provide sales and checkout purchases. In this regard, sales application 122 may be utilized by a user of merchant device 120 to provide a website and/or online portal for transaction processing and sales. For example, sales application 122 may be used to host a website having one or more webpages that may be used to browse items for sale and generate a transaction for one or more items. Sales application 122 may the provide a checkout process, which may be utilized to pay for a transaction. In some embodiments, the checkout process may be provided by transaction processor 130 based on one or more operations, SDKs, and the like that may be implemented in the merchant website. The checkout process may be used to pay for a transaction using a payment instrument, including a credit/debit card, and account with transaction processor 130, or the like. Sales application 122 may be utilized by the merchant to view one or more user interfaces (UIs), for example, via graphical UIs (GUIs) presented using an output display device of user device 110. Thus, these UIs may be used to navigate through items for sale on the merchant website, generate a transaction, and checkout for the transaction on the merchant website. Further, sales application 122 may further provide gift card services, such as those to sell digital gift cards for exact values of transactions or general values (e.g., $100), which may include discounts and savings on the gift card values.

In order to provide checkout services, sales application 122 may include checkout elements 124 for the merchant website provided by sales application 122. Checkout elements 124 may correspond to webpage elements within one or more webpages that provide the operations, input fields, menus, and the like to complete a checkout. Thus, checkout elements 124 may include HTML or XML code snippets and the like that may be parsed and mapped when generating and executing a script to detect when a final checkout total is complete. For example, checkout elements 124 may be parsed to identify which elements need to be present and/or have input or other data when a checkout total is finalized for a transaction. Checkout elements 124 may be located in a DOM tree, hierarchy, or other structure for the merchant website, which may be parsed to be identified for checkout element monitoring and final total detection. Checkout elements 124 may include elements for coupons or savings, shipping, billing, name, account identifier, item total, sales tax, tip, shipping costs, and the like. Transaction processor 130 may initially parse checkout elements 124 and may generate the script. Thereafter, the script may be passed to user device 110 when user device 110 is processing a checkout, which may parse the DOM tree of the merchant website, identify checkout elements 124 that require monitoring, and monitor those elements for a checkout total that has been finalized.

Merchant device 120 may further include database 126 stored on a transitory and/or non-transitory memory of merchant device 120, which may store various applications and data and be utilized during execution of various modules of merchant device 120. Database 126 may include, for example, identifiers such as operating system registry entries, cookies associated with sales application 122, identifiers associated with hardware of merchant device 120, or other appropriate identifiers, such as identifiers used for payment/user/device authentication or identification, which may be communicated as identifying the user/merchant device 120 to transaction processor 130. Moreover, database 126 may include UI data for display of UIs, item and/or merchant marketplace data, checkout data for transactions, and transaction results. Additionally, data necessary for issuing one or more digital gift cards may be stored by database 126, such as gift card values, issued gift cards, discounts and savings for gift cards (e.g., percentage or value savings, and other more general savings and coupon data.

Merchant device 120 includes at least one network interface component 128 adapted to communicate with user device 110 and/or transaction processor 130. In various embodiments, network interface component 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Transaction processor 130 may be maintained, for example, by an online service provider, which may provide operations for monitoring checkout elements and exact amount gift card offers. Various embodiments of the gift card system described herein may be provided by transaction processor 130 and may be accessible by user device 110 when accessing a website provided by merchant device 120. In such embodiments, transaction processor 130 may interface with user device 110 for monitoring checkout webpages, such as by passing data and/or a script to user device 110 for monitoring webpage elements and code snippets for detection of a checkout total when completed on a merchant webpage. Transaction processor 130 includes one or more processing applications which may be configured to interact with user device 110 and merchant device 120. In one example, transaction processor 130 may be provided by PAYPAL®, Inc. of San Jose, CA, USA. However, in other embodiments, transaction processor 130 may be maintained by or include another type of service provider.

Transaction processor 130 of FIG. 1 includes checkout monitoring application 140, a transaction processing application 132, a database 134, and a network interface component 138. Checkout monitoring application 140 and transaction processing application 132 may correspond to executable processes, procedures, and/or applications with associated hardware. In other embodiments, transaction processor 130 may include additional or different modules having specialized hardware and/or software as required.

Checkout monitoring application 140 may correspond to one or more processes to execute modules and associated specialized hardware of transaction processor 130 to provide data, operations, and processes to monitor checkout elements for a checkout total, and thereafter utilize transaction processing application 132 for digital gift card sales. In this regard, checkout monitoring application 140 may correspond to specialized hardware and/or software used by a user associated with user device 110 to establish an account with checkout monitoring application 140 and/or access another account with transaction processor 130. For example, an account provided by HONEY® may be provided by checkout monitoring application. However, a more general account (e.g., a PAYPAL® account) may also provide the aforementioned account services and be utilized when perform checkout monitoring and exact amount digital gift cards. Checkout monitoring application 140 may correspond to a product of transaction processor 130 that may be utilized by end users to receive exact amount gift cards. Checkout monitoring application 140 may also include or utilize different processors, engines, or models as required for an authentication, account setup and maintenance, electronic transaction processing, deposit and/or withdrawal, and the like, for example, through one or more platforms that may be integrated through different API integrations to allow APIs of the platforms, services, and applications to exchange data. Checkout monitoring application 140 may include one or more APIs that perform API calls and requests, and receive responses, in order to perform checkout monitoring and exact amount gift cards offers.

For example, checkout monitoring application 140 includes a DOM tree parser 142 that may parse a DOM tree of a merchant website to identify checkout elements 124 and generate an element monitor script 144. DOM tree parser 142 may parse through the DOM tree for the merchant website and determine that checkout elements 124 need to be monitored, as well as the required data and/or elements present when a checkout total is finalized for a transaction. Thereafter, element monitor script 144 may be generated as an automated computing operation having a Javascript set that can be passed to user device 110 when on a merchant website to monitor checkout elements 124. Element monitor script 144 may be specific to the merchant webpage or may be more generalized for multiple merchant webpages having the same or similar checkout process. Thereafter, checkout monitoring application 140 may pass element monitor script 144 to user device 110 when user device 110 accesses a merchant website and/or checkout process corresponding to merchant device 120. Element monitoring script 144 may be stored with script data 136 for one or more merchant webpages.

Prior to finalizing a checkout total and/or amount for a transaction, a couponing process 146 may be implemented to apply additional savings to the transaction. Couponing process 146 may determine available coupons, which may be provided to user device 110 for use with a transaction. After applying any additional savings, a checkout total may be finalized. Thereafter, once a checkout total is determined and finalized, the checkout total may be provided to transaction processing application 132 by an exact gift card process 148 for generation of a digital gift card offer for a gift card value corresponding to the checkout total. Transaction processing application 132 may determine the transaction, which may be offered to the user through application 112 of user device 110 by exact gift card process 148. Thereafter, exact gift card process 148 may interface (e.g., via one or more API calls, requests, and/or responses) with user device 110, merchant device 120, and/or transaction processing application 132 in order to facilitate processing of the digital gift card.

Transaction processing application 132 may correspond to one or more processes to execute software using associated hardware components of transaction processor 130 to process a transaction or provide another payment service to merchants and customers of transaction processor 130. In some embodiments, transaction processing application 132 may be used by a user associated with merchant device 120 to establish a payment account and/or digital wallet, which may be used to process transactions. In various embodiments, financial information may be stored to the account, such as account/card numbers and information. A digital token for the account/wallet may be used to send and process payments, for example, through an interface provided by transaction processor 130. The payment account may be accessed and/or used through a browser application/extension and/or dedicated payment application executed by merchant device 120 and engage in transaction processing through transaction processing application 132. In various embodiments, transaction processing application 132 may be used to generate a transaction for an exact amount digital gift card, such as by interfacing with merchant device 120 through one or more API calls and the like. Transaction processing application 132 may process the payment and may provide a transaction history to merchant device 120 for transaction authorization, approval, or denial. Where a digital gift card may be purchased, transaction processing application 132 may be used to provide gift card information to user device 110 for use with a transaction.

Additionally, transaction processor 130 includes database 134. Database 134 may store various identifiers associated with user device 110. Database 134 may also store account data, including payment instruments and authentication credentials, as well as transaction processing histories and data for processed transactions. Database 134 may store received data associated with a user for use in determining gift card offers for digital gift cards. Database 134 may store script data 136 for one or more merchant webpages. In this regard, script data 136 may be utilized and/or passed for parsing merchant websites and monitoring checkout status on such websites. Further, incentives, savings, and digital gift card information may be stored by database 134 for later use in allocating incentives and receiving benefits or rewards from the incentives.

In various embodiments, transaction processor 130 includes at least one network interface component 138 adapted to communicate user device 110, merchant device 120, and/or another device/server for a merchant over network 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2A:
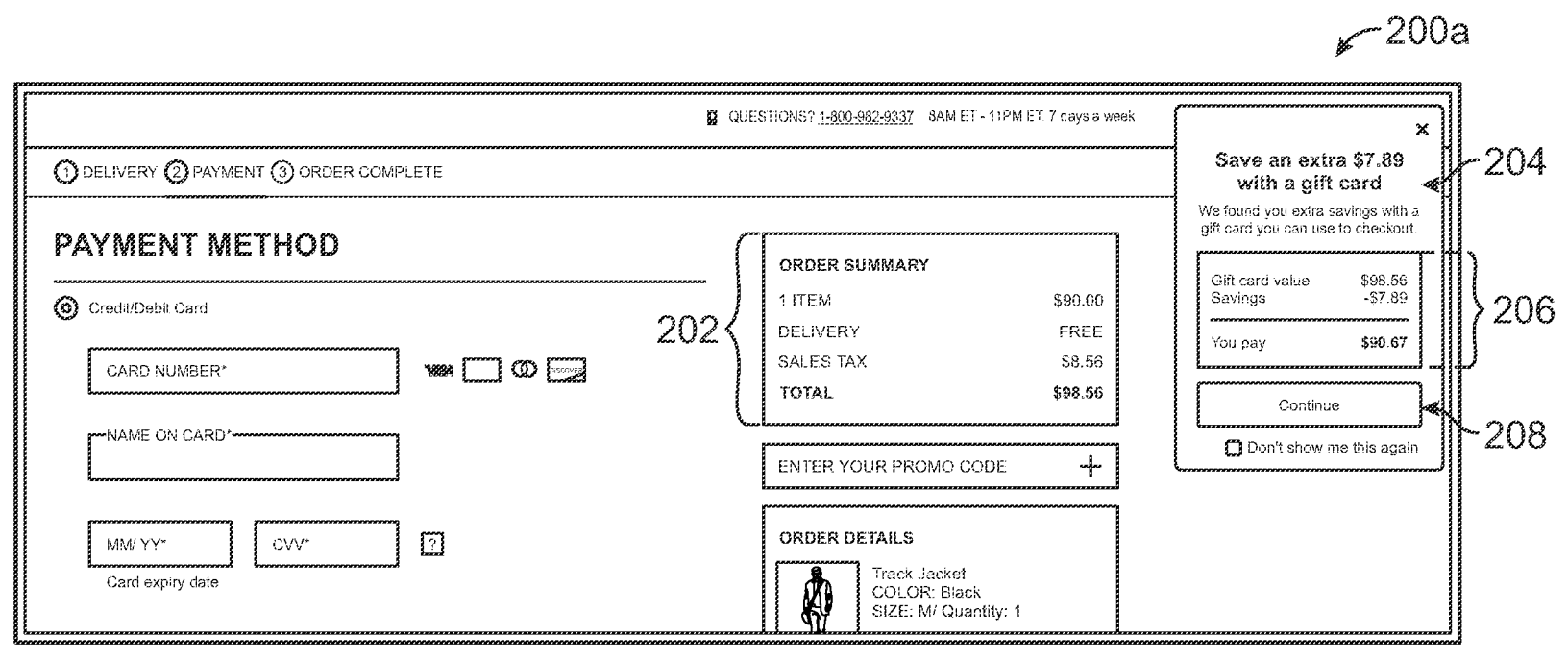

FIG. 2A is an exemplary user interface 200a displaying a merchant website during a digital checkout for a transaction, according to an embodiment. User interface 200a of FIG. 2A may be displayed by user device 110 discussed in reference to system 100 of FIG. 1. In this regard, user device 110 includes user interface 200a of an application that may access merchant website and receive an offer for a digital gift card for a discounted amount used to pay for a transaction total.

User interface 200a on user device 110 displays a checkout portal and/or process on a merchant website, which includes one or more items selected for purchase in a transaction 202. For example, a user may have selected a jacket for purchase from a merchant associated with user interface 200a. When navigating to a shopping cart interface (e.g., for a digital shopping cart having one or more items for purchase from the merchant), a checkout option may be provided to complete a checkout for the selected items in the digital shopping cart. By requesting a checkout through the checkout interface(s) and process(es) of the merchant website, transaction 202 may be generated having an order summary, item total, delivery cost, sales tax, and a final total.

In order to detect the final total for transaction 202, a browser extension in a web browser application or application process in a resident dedicated application may execute a script passed to the application by a transaction processor and based on the visited merchant website. The script allows for monitoring and processing webpage elements and/or code snippets associated with transaction 202 in the web program code for the merchant website. Thereafter, a total of 98.56 for transaction 202 is detected, and the total is determined to be a final total based on the presence of and/or data for the corresponding elements and/or code snippets. This is determined to be a final total for purposes of purchasing an exact dollar or amount digital gift card, which allows for transaction processing for the entire total of transaction 202 without further payments.

Once the final total is detected, another window (e.g., a popup window, interface field, or the like) is displayed with the merchant website, such as a window 204 overlaid onto the merchant website by the extension or application process. In window 204, data is displayed for the exact amount digital gift card. This includes a gift card value 206 having a savings of $7.89 when purchased for the value of $98.56, the amount for transaction 202's total. Thus, a gift card having a gift card value of $98.56 representing the final total transaction 202 may be purchased for $90.67, factoring the savings of $7.89 in buying and using the gift card. If the user viewing window 204 would like to purchase a digital gift card for gift card value 206, a gift card purchase option 208 may be selected in window 204. Gift card purchase option 208 then allows for navigation to further windows or interfaces to process a payment for the offered gift card, which navigates to a user interface 200b in FIG. 2B.

Figure 2B:
FIG. 2B is an exemplary user interface displaying an option to purchase an exact amount digital gift card for use in processing a transaction on a merchant website based on parsed and monitored website data, according to an embodiment.

FIG. 2B is an exemplary user interface 200b displaying an option to purchase an exact amount digital gift card for use in processing a transaction on a merchant website based on parsed and monitored website data, according to an embodiment. User interface 200b of FIG. 2B may be displayed by user device 110 discussed in reference to system 100 of FIG. 1. In this regard, user device 110 includes display interface 200b of an application that may access merchant website and process an offer for a digital gift card for a discounted amount used to pay for a transaction total.

User interface 200b is displayed in response to selection of gift card purchase option 208, which navigates window 204 to a larger display of a window 210 that allows for purchase of a digital gift card for gift card value 206. For example, in window 210, a digital gift card 212 may be purchased for a value of $98.56 but at a cost of $90.67 to a user purchasing digital gift card 212. Thus, gift card value 206 is further shown in interface 200b, which allows for transaction processing. In window 210, a payment instrument for purchasing the gift card may be selected, such as an account with an online transaction processor or other financial instrument and/or account with stored value (e.g., payment card, bank account, virtual currency, cryptocurrency, or the like). If the user is satisfied with gift card value 206 for digital gift card 212, the user may engage in electronic transaction processing to purchase digital gift card 212 by selecting an approve purchase option 214, which approves the purchase and causes the online transaction processor to process a transaction electronically for digital gift card 212. Thereafter, the browser extension and/or application may navigate to a user interface 200c to utilize digital gift card 212 with transaction 202.

Figure 2C:
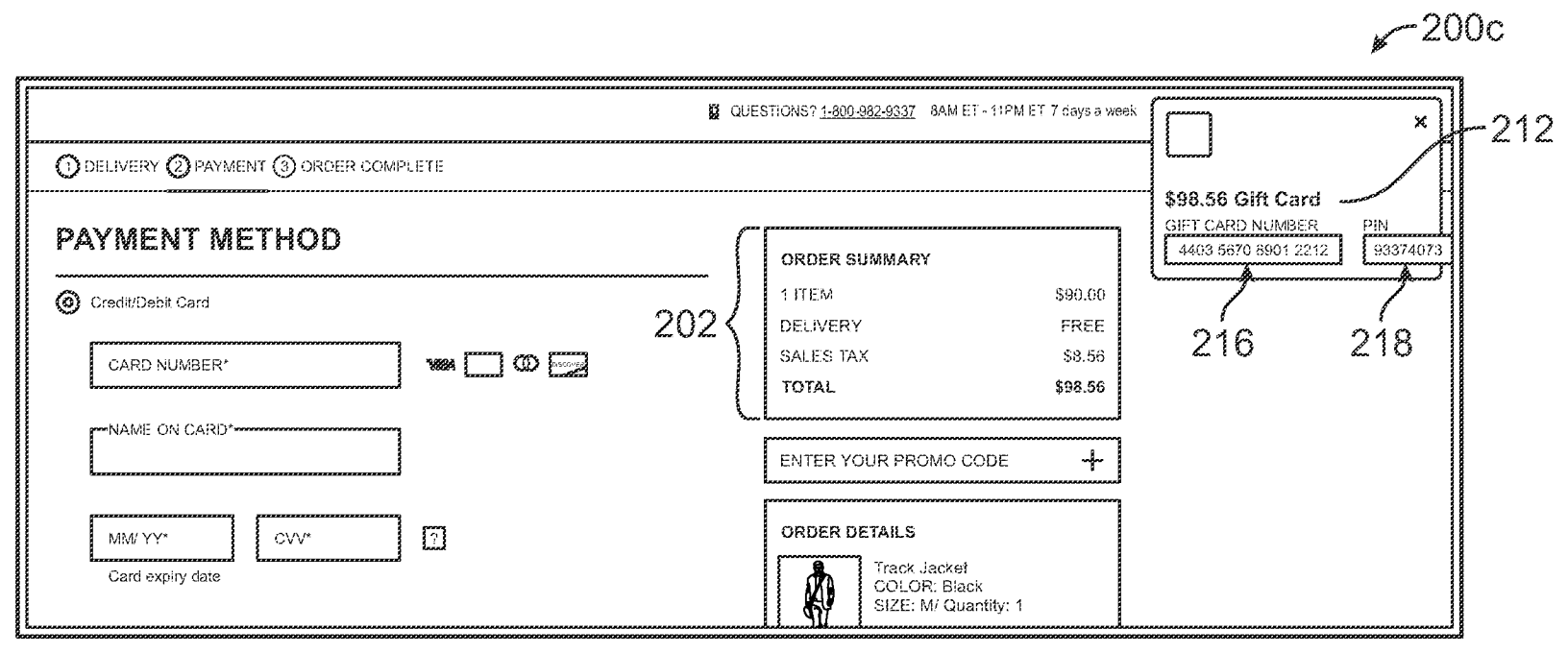

FIG. 2C is an exemplary user interface 200c displaying a merchant website during a digital checkout for a transaction that is processed using an exact amount digital gift card, according to an embodiment. User interface 200c of FIG. 2C may be displayed by user device 110 discussed in reference to system 100 of FIG. 1. In this regard, user device 110 includes display interface 200c of an application that may access merchant website and utilize a digital gift card with a transaction processed on the merchant website.

User interface 200c is displayed after purchase of digital gift card 212 by a user via user interface 200b. In this regard, user interface 200c displays the merchant website and checkout process, which allows electronic transaction processing for transaction 202. In order to pay for transaction 202, an exact value is associated with digital gift card 212, which allows for payment of $98.56 for transaction 202. This digital gift card 212 includes a balance of $98.56, an amount specific to this transaction. Additionally, digital gift card 212 has a gift card number 216 (e.g., card identifier) that allows application of digital gift card 212 to a transaction during processing. An additional security measure, such as a PIN 218, may also be associated with digital gift card 212. The user may then enter digital gift card 212 for payment of transaction 202 through entering gift card number 216 and/or PIN 218 to one or more interface fields for gift card use and redemption via the merchant website. In some embodiments, entry of gift card number 216 and/or PIN 218 may be done automatically by the browser extension and/or application process. For example, a script or other automated computing process may determine webpage elements for entry of gift card information for gift card number 216 and/or PIN 218 and automatically fill in the elements with corresponding gift card information. Thus, the user may not be required to enter the input directly.

The above example illustrates when an exact amount gift card is available to be provided to the user. However, in other embodiments, the user may not be eligible for the exact amount, such as if the final checkout total, before or after applying any discounts from a gift card purchase, exceeds a maximum limit for the user or for the merchant. Using the above example, if the user is only approved for a maximum of a $50 gift card or a gift card having a value of $62.26, such as due to previous purchases of gift cards or other restrictions or limits, the user is still provided the option of purchasing a gift card and a corresponding discount would be applied to the transaction total. The remaining balance would then be paid through another funding source, such as one associated with a user account with the merchant or payment service provider. As such, the user is still provided the benefit of a reduced transaction total, even when the user is not eligible to purchase a full exact amount gift card.

Figure 3A:
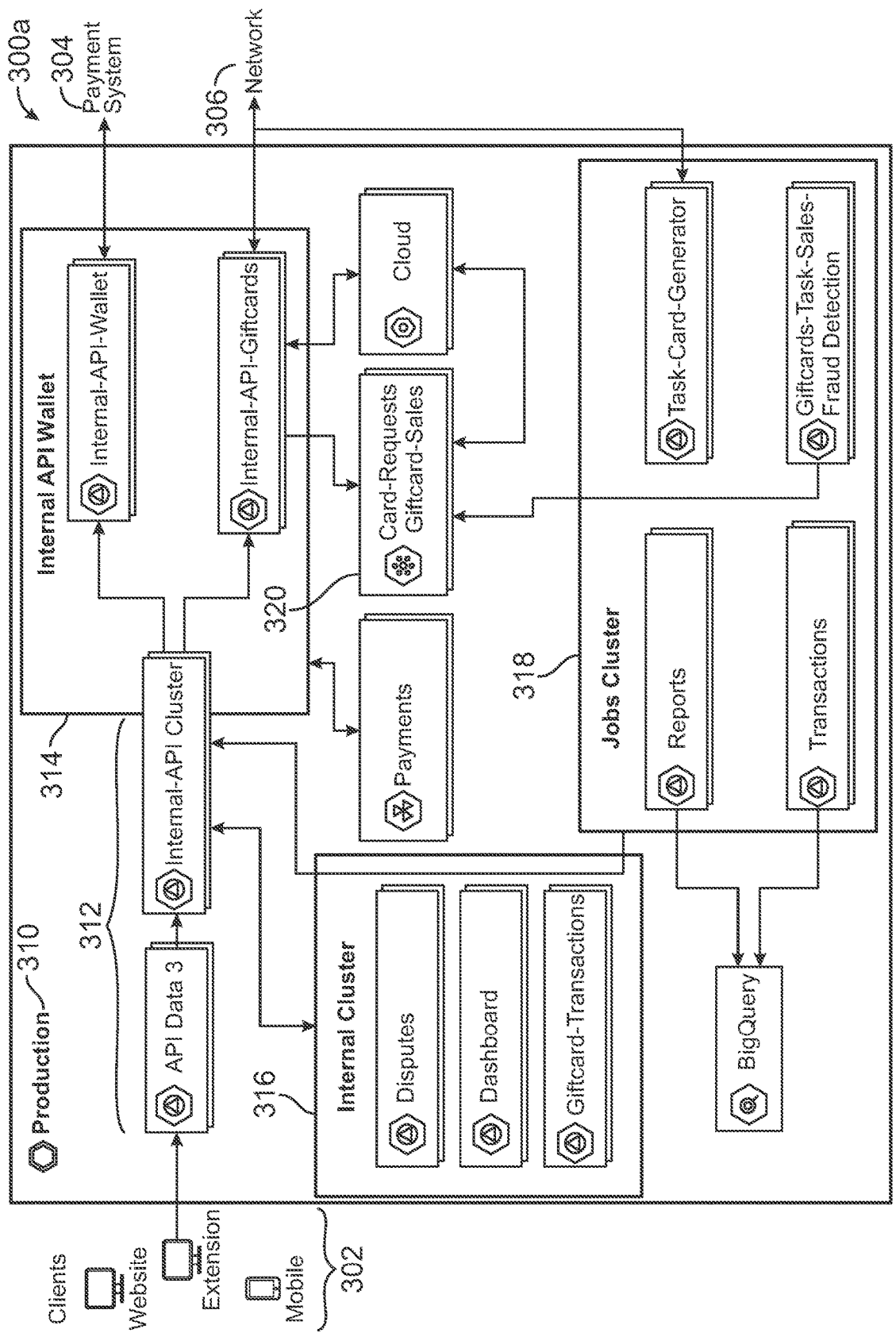
FIG. 3A is exemplary system environment used to provide a computational platform for detecting website data for a final checkout total when offering exact amount digital gift cards, according to an embodiment.

FIG. 3A is an exemplary system environment 300a used to provide a computational platform for detecting website data for a final checkout total when offering exact amount digital gift cards, according to an embodiment. System environment 300a includes customers 302 that may interact with the platforms and computing systems of system environment 300a, such as through user device 110 discussed in reference to system 100 of FIG. 1. System environment 300a may correspond to a system for providing electronic transaction processing, offers, and incentives through different integrated platforms including exact amount gift card values for transactions.

In system environment 300a, customers 302 may correspond to users that utilize a browser extension and/or mobile or device application for receiving exact amount gift card offers during online digital transaction processing with merchant websites. In this regard, a website is detected by an extension or application accessing the website on a device of customers 302. A production 310 may correspond to a computing environment where production computing systems are deployed, including a computing system deployed for generating and passing scripts for detecting checkout totals during electronic transaction processing. This script may be executed with the devices of customers 302 to detect when webpage elements and/or code snippets indicate a transaction total has been finalized and is ready for electronic transaction processing and payment using an exact amount or value digital gift card.

Thus, in production 310, API gateway 312 serve as internal gateways and connect and communicate with external data sources and devices, such as customers 302. API gateway 312 may pass data through API calls, requests, and responses, which may be processed using the internal systems in product 310 and/or one or more additional services and/or networks connected to production 310. For example, an internal API cluster 314 may provide internal APIs to connect with digital wallets and gift card purchasing services. In this regard, internal API cluster 314 may further connect with a payment system 304 for processing of payments, including those for exact amount digital gift cards that are applied to a detected transaction total. Internal API cluster 314 may also connect to a gift card network 306 in order to purchase digital gift cards for exact values of transaction totals.

In various embodiments, API gateway 312 may also connect with a savings internal cluster 316, which may include applications, services, and/or microservices provided to customers 302. Savings internal cluster 316 may provide operations and/or services for disputes, dashboard information and processes for a browser extension or application, and/or gift card transaction services. In order to process transactions for exact amount digital gift cards, internal API cluster 314 may further connect with a jobs cluster 318 via a gift card sales service 320. Jobs cluster 318 may correspond to a cluster that executes computing jobs, such as to purchase exact amount digital gift cards. Thus, as a request for a gift card purchase is provided to jobs cluster 318 from gift card sales service 320, jobs cluster 318 may interface with the internal services, APIs, and the like of production 310, as well as payment system 304 and/or gift card network 306 for purchase of an exact amount digital gift card.

Figure 3B:
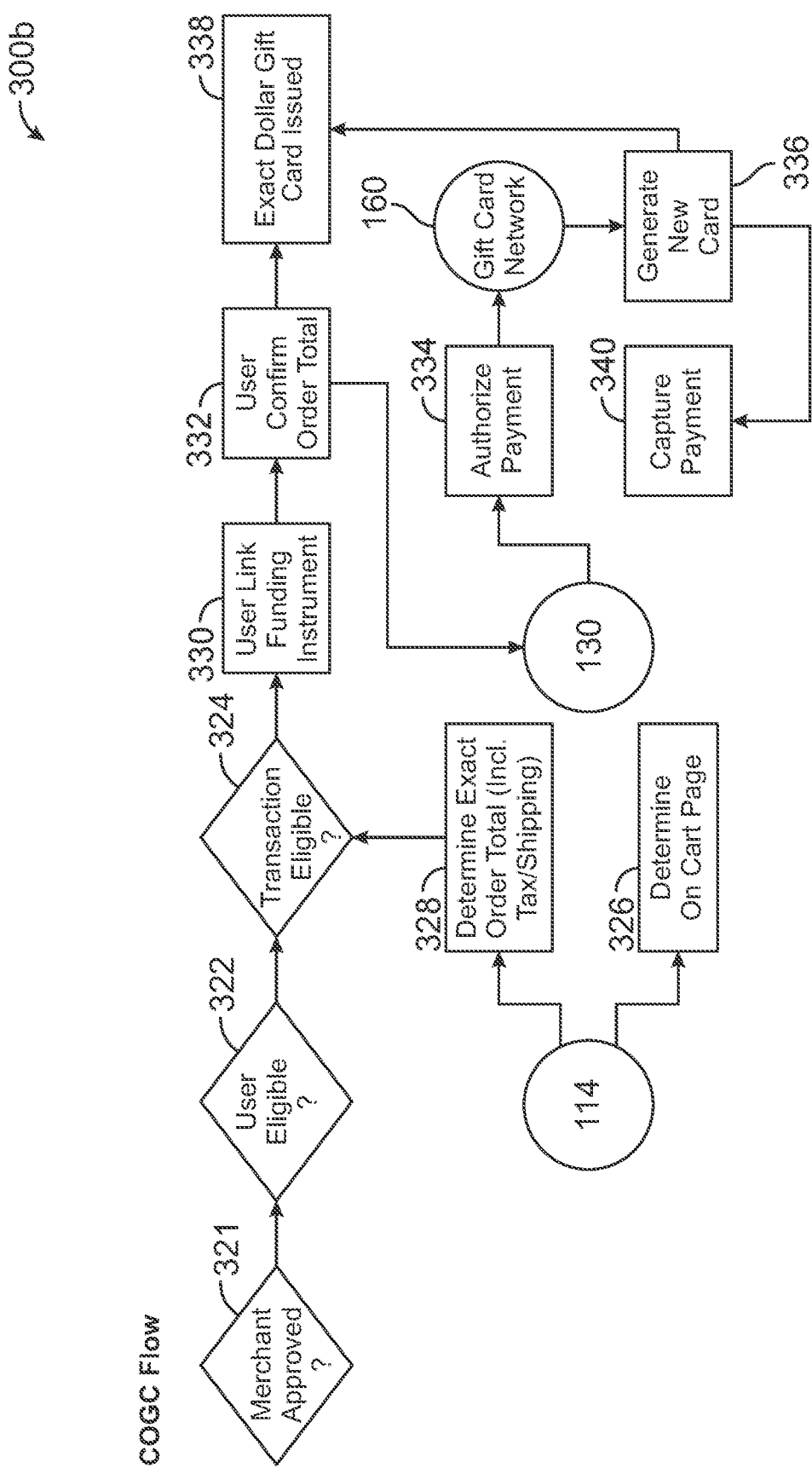
FIG. 3B is a flowchart of exemplary interactions between computing systems and when detecting final checkout data entry for exact amount gift cards, according to an embodiment.

FIG. 3B is a flowchart 300b of exemplary interactions between computing systems and when detecting final checkout data and providing exact amount gift cards. Note that one or more steps, processes, and methods described herein of flowchart 300b may be omitted, performed in a different sequence, or combined as desired or appropriate. Further, flowchart 300b in FIG. 3B includes monitoring extension 114 and transaction processor 130 discussed in reference to system 100 of FIG. 1 that interact with a gift card network 160 to purchase exact amount digital gift cards.

At step 321 of flowchart 300b, a browser extension and/or application executes steps to determine whether a merchant corresponding to a visited merchant website is approved for an exact dollar, amount, or value digital gift card offer and sale. For example, when a device accesses the merchant website through a browser or application providing the webpage element monitoring and digital gift card sales services, operations of that extension and/or application may determine if the merchant is onboarded and has a corresponding script that can be passed to the extension/application for monitoring webpage elements. At step 322, it is further determined whether the user is eligible for an exact amount digital gift card offer and purchase. For example, the user may require an account to purchase a digital gift card and participate in eligible offers and/or savings. This includes determining whether the user is approved to receive such offers (e.g., in good standing, not a fraud risk, etc.).

At step 324, the extension and/or application determines whether the transaction is eligible for an exact amount digital gift card. The extension and/or application may utilize the script for the corresponding merchant website and/or checkout process to parse a DOM tree, identify elements and code snippets to monitor on the website during the checkout, and monitor such elements and code snippets. Thus, at step 326, monitoring extension 114 determines that a computing device for a user (e.g., mobile smart phone, personal or tablet computer, or the like) is at a cart page, such as a page for a digital shopping cart checkout. This includes determining if the URI or URL indicates a cart page has been accessed and/or monitoring webpage elements and code snippets for those associated with the cart page. At step 328, the extension and/or application then determines an exact order total (including tax/shipping/etc.), such as a total finalized through the shopping cart and checkout processes. This may be identified from the monitored elements and code snippets from the parsed DOM tree.

Once a transaction total is identified, a digital gift card for an exact amount of the total may be determined and provided to the user via a window or other output through a UI. This may include any reduced cost to the purchase of the gift card value for the transaction total. In order to process a purchase of an exact amount digital gift card, the user may be required to engage in electronic transaction processing. At step 330, the user links or uses a funding instrument for payment of the cost of the digital gift card at the agreed upon gift card value (e.g., for the transaction total). Once a funding instrument (e.g., payment card, digital payment account, or the like) is linked or approved for use, at step 332, the user confirms the order total. This may include confirming that the order total is for the exact amount of the transaction total and thus the digital gift card can be applied to the transaction total to complete payment for the transaction.

In order to process a transaction for the digital gift card authorized by the user, at step 334, transaction processor 130 of FIG. 1 authorizes a payment to gift card network 160 using the linked funding instrument from the user. For example, transaction processor 130 may authorize a payment of the amount for the cost of the digital gift card, which may be a reduced amount from the transaction total and gift card value or balance with a savings applied. The payment may deduct, charge, or withdraw the amount from the funding instrument and be provided to gift card network 160 for purchase of the digital gift card. At step 336, a digital gift card is generated by gift card network 160. This is then issued to the user at step 338, where issuing to the user may cause card information for the digital gift card to be populated within a user interface. This may include displaying a card identifier, PIN or other security mechanism, and/or gift card balance. Further, the card information may be automatically entered to one or more interface fields for redemption and use of the digital gift card. Thus, at step 340, a payment is captured for the transaction total using the issued gift card. This may include performing electronic transaction processing for the transaction using the gift card's information, the merchant's checkout systems, and gift card network 160.

Figure 4:
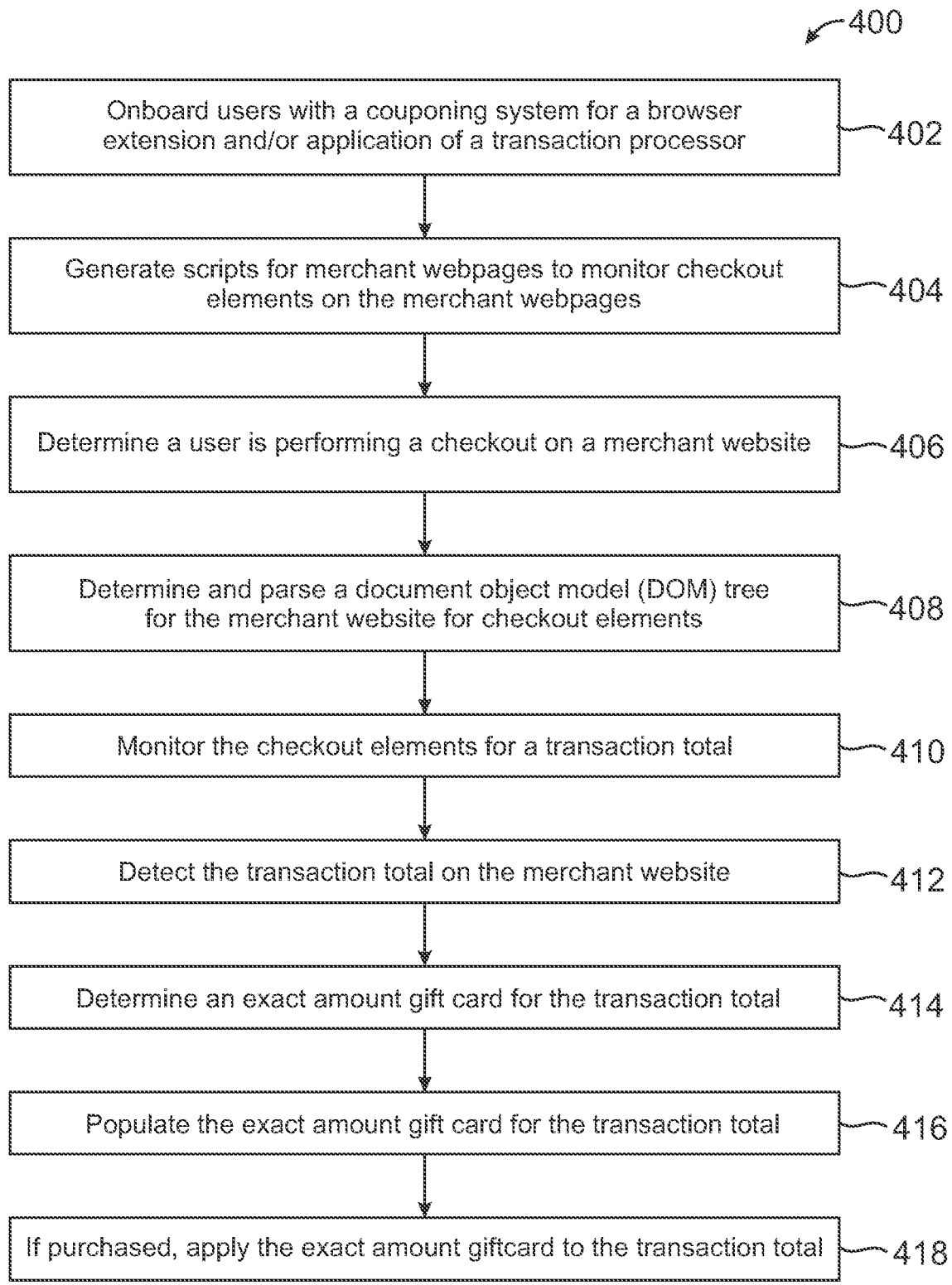
FIG. 4 is a flowchart for processes utilized by a browser tool and application for detecting final checkout data entry for exact amount gift cards, according to an embodiment.

FIG. 4 is a flowchart 400 for processes utilized by a browser tool and application for detecting final checkout data and providing an amount gift card, according to an embodiment. Note that one or more steps, processes, and methods described herein of flowchart 400 may be omitted, performed in a different sequence, or combined as desired or appropriate.

At step 402 of flowchart 400, users are onboarded with a couponing system for a browser extension and/or application of a transaction processor. Onboarding may include signing the users up for one or more accounts that allow for purchasing of digital gift cards and/or use of coupons and other savings. Further, onboarding may include installing an application extension and/or device application on devices of the users. At step 404, scripts are generated for merchant webpages to monitor checkout elements on the merchant webpages. The scripts may be generated by parsing DOM trees for the merchant websites to identify webpage elements and code snippets associated with a checkout process, such as those necessary for a checkout total to be finalized. The scripts may correspond to a Javascript set or the like that can be passed to cause the extension or application to monitor webpage elements and code snippets. Further, the scripts may be specific to certain merchant websites and/or checkout processes or may be interchangeable if the same or similar elements and code is used.

At step 406, a user from the onboarded users is determined to be performing a checkout. This may be detected from a URI or URL entered to a web browser and/or accessed through a different device application (e.g., a resident local application for the device). The address for the checkout webpages and/or processes may cause the extension and/or application to execute, request, and/or fetch a script for the merchant website and/or checkout process from an online transaction processor providing gift card purchasing services for exact amount digital gift cards. A script is then used to monitor the parsed elements from the DOM tree. At step 408, a DOM tree for the merchant website is determined and parsed for checkout elements. For example, the DOM tree may correspond to a hierarchy for the website that identifies the components and elements on the webpages of the website. The DOM tree may be parsed so that the elements required to be monitored are identified. Thereafter, at step 410, the checkout elements are monitored for a transaction total. This may include determining when the elements and/or code snippets are present and utilized for proper data entry and processing to determine a transaction total. For example, the elements may require a shipping total, tax, tip, and other required information to determine the transaction total is finalized.

At step 412, after the monitoring, the transaction total is detected on the merchant website. For example, a total may be detected when the input and processing on the merchant website is completed to a point where a final total is being requested and no additional costs are required to be added to the transaction. This may be detected based on the monitored elements and code snippets. Thus, at step 414, an exact amount gift card for the transaction total is determined. The exact amount gift card may correspond to a digital card purchased and issued from a gift card network, such as a third-party integration with the network and/or a merchant issuing system. The exact amount gift card may be for a discounted rate over the gift card balance or value, which may be based on integrations with different third-parties and/or merchants.

At step 416, the exact amount gift card is populated within a window for the transaction total. For example, a window may be displayed with the transaction total that shows the exact amount or value for the balance of the digital gift card (e.g., the transaction total). Further, the window may show any savings or additional costs from purchasing the gift card over the gift card network. Within the window, an option, button, menu, and/or field may be provided to initiate a transaction to purchase the exact amount gift card. For example, the user may be required to select or link a funding source, which may then be used to issue a payment for the exact amount gift card. Thus, at step 418, if the exact amount gift card is purchased, the exact amount gift card is applied to the transaction total. For example, gift card information (e.g., identifiers, security codes, etc.) may be displayed within the window for the digital gift card. An operation of the extension and/or application may also automatically apply and/or enter the gift card information to one or more interface fields so that the exact amount gift card may be applied to the transaction.

Figure 5:
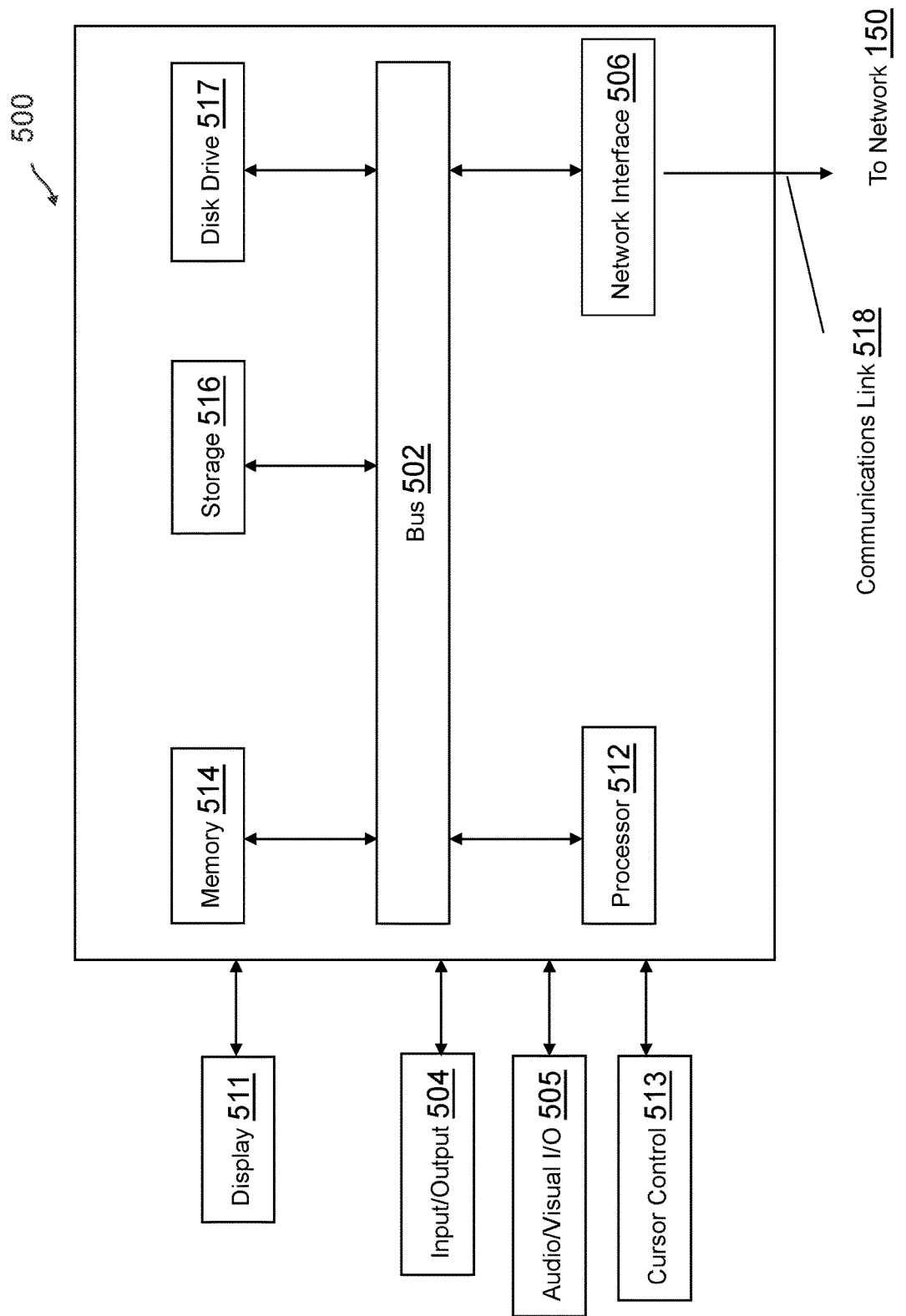
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, images, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output (I/O) component 505 may also be included to allow a user to use voice for inputting information by converting audio signals and/or input or record images/videos by capturing visual data of scenes having objects. Audio/visual I/O component 505 may allow the user to hear audio and view images/video including projections of such images/video. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. For example, while the description focuses on gift cards, other types of funding sources that can be used to fund a transaction and provide additional value for their purchase are also within the scope of various embodiments of the invention. Thus, the present disclosure is limited only by the claims.

What is claimed is:

1. A system comprising:
   a non-transitory memory having instructions stored thereon; and
   one or more hardware processors coupled to the non-transitory memory and configured to read the instructions from the non-transitory memory to cause the system to perform operations comprising:
      detecting, via an application operation for an application on a computing device of a user, a checkout processing flow initiated on a merchant website by the application for a transaction with a merchant corresponding to the merchant website;
      parsing, using a webpage parsing script for at least the merchant website, a website structure for a plurality of elements on webpages of the merchant website;
      identifying a hypertext markup language (HTML) code snippet on at least one of the webpages, wherein the HTML code snippet processes a first element of the plurality of elements for the transaction and generates a calculated fee associated with the transaction, and wherein the calculated fee is separate from a transaction total of the transaction and added to the transaction total when calculated;
      determining a subset of elements from the plurality of elements that, when present having corresponding data in the subset of elements during the checkout processing flow, indicate the transaction total for the transaction is finalized;
      monitoring the first element for the calculated fee and the subset of elements for the corresponding data during the checkout processing flow;
      detecting that the calculated fee and the corresponding data have been provided on the at least one of the webpages of the merchant website, wherein the detecting includes determining that the HTML code snippet has been executed to generate the calculated cost;
      determining a prepaid value for a payment card service of a transaction processor that enables processing of the transaction with the merchant for at least a portion of the transaction total and the calculated fee;
      determining an integration with the merchant that allows for purchasing of the prepaid value for the merchant at a value less than the prepaid value;
      determining that the prepaid value is available to be purchased for the value; and
      outputting a purchase option to the user of the prepaid value from the payment card service in association with the checkout processing flow on the merchant website using one of the application or the application operation.

2. The system of claim 1, wherein the value is less than the transaction total, wherein a purchase and a use of the prepaid value provides a full amount of the prepaid value as at least a partial payment for the transaction after purchase, and wherein the purchase option for the prepaid value further includes a discount from the transaction total.

3. The system of claim 1, wherein the operations further comprise:
   receiving a request to purchase the prepaid value via the purchase option;
   determining an account for the user that is associated with one of the application or the application operation;
   processing a payment for the prepaid value based on the request and the account; and
   providing redemption information for the prepaid value to the user.

4. The system of claim 1, wherein, prior to the detecting, the operations further comprise:
   parsing a webpage element hierarchy of the merchant website for the plurality of elements on the webpages; and
   mapping the website structure for the merchant website based on the parsing, wherein the mapping identifies the subset of elements for processing, by the merchant or the transaction processor, at least the transaction via the checkout processing flow.

5. The system of claim 4, wherein the operations further comprise:
   generating the webpage parsing script based on the mapping.

6. The system of claim 1, wherein, prior to the parsing, the operations further comprise:
   determining the webpage parsing script usable with the merchant website based on a webpage address for at least one of the webpages of the merchant website.

7. The system of claim 1, wherein prior to the detecting, the operations further comprise:
   passing the webpage parsing script to the application that enables storage by a device-side storage of the computing device.

8. The system of claim 1, wherein the calculated fee transaction comprises at least one of a tax, a shipping fee, a tip, or a delivery cost.

9. The system of claim 1, wherein the checkout processing flow is initiated based on a navigation in the application that is associated with the merchant website, and wherein the checkout processing flow includes at least one of an entry of data to a field on one of more of the webpages, an entry or a transmission of payment instrument information to the merchant website, or an account login on the merchant website.

10. A method comprising:
    detecting, via an application operation for an application on a computing device of a user, a navigation to a merchant website of a merchant by the application;
    parsing, using a webpage script having a mapping of a plurality of elements for at least the merchant website, a website structure for the plurality of elements on webpages of the merchant website, wherein the plurality of elements comprise transaction payment fields associated with different payment amounts included in transaction totals for transactions that are processed on the merchant website, and wherein the transaction payment fields are designated in the mapping of the plurality of elements;
    identifying a hypertext markup language (HTML) code snippet on at least one of the webpages, wherein the HTML code snippet processes a first element of the plurality of elements for the transactions and generates calculated fees associated with the transactions, and wherein the calculated fees are separate from transaction totals of the transactions and added to the transaction totals when calculated;
    determining, during the checkout processing flow initiated for a transaction on the merchant website based on the parsing, that data for the different payment amounts and a calculated fee are present in the transaction payment fields and the first element from the plurality of elements, wherein the data corresponds to a transaction total for the transaction;

determining a prepaid value from a payment card service that can be applied to the transaction total when processing the transaction in the checkout processing flow;

determining an integration by the payment card service with the merchant that allows for purchasing of the prepaid value for the merchant at a value less than the prepaid value;

determining that the prepaid value is available to be purchased for the value, wherein the value is less than the transaction total, and wherein a purchase and a use of the prepaid value provides a full amount of the prepaid value as at least partial payment for the transaction; and providing a purchase option of the prepaid value from the payment card service in association with the checkout processing flow on the merchant website using one of the application or the application operation.

11. The method of claim 10, wherein the purchase option of the prepaid value further includes a discount applied to the transaction total.

12. The method of claim 10, further comprising:
processing the purchase of the prepaid value based on a selection of the purchase option; and
at least one of: (a) providing a digital code for the prepaid value to the user; or (b) automatically entering the digital code to a payment instrument field of the checkout processing flow.

13. The method of claim 10, wherein the mapping is based on a website structure tree representing the plurality of elements previously mapped for at least the transaction payment fields.

14. The method of claim 10, wherein the transaction payment fields include at least one of a payment processing service, a tax, a transaction amount, or an item delivery cost.

15. The method of claim 10, further comprising:
determining at least one additional discount for the transaction; and
applying the at least one additional discount to the transaction, wherein the applying reduces the transaction total by the at least one additional discount,
wherein the purchase option for the prepaid value is based on the transaction total reduced by the at least one additional discount.

16. The method of claim 10, wherein the webpage script is implemented from a software development kit for a plurality of merchant websites including the merchant website.

17. A non-transitory machine-readable medium having stored thereon machine-readable instructions executable to cause a machine to perform operations comprising:
receiving, from an application operation for an application on a computing device of a user, a request for a gift card value usable to process a transaction with a merchant website of a merchant being presented in the application;

executing a webpage parsing script for at least the merchant website, wherein the webpage parsing script comprises a mapping designating webpage elements having transaction data present when a transaction total for the transaction is displayed;

parsing data from a plurality of elements of a checkout processing flow for the transaction, wherein the plurality of elements are included in a website structure for webpages of the merchant website;

identifying a hypertext markup language (HTML) code snippet on at least one of the webpages, wherein the HTML code snippet processes a first element of the plurality of elements for the transaction and generates a calculated fee associated with the transaction, wherein the calculated fee is separate from the transaction total and added to the transaction total when calculated;

determining whether the transaction data and the calculated fee are present from the plurality of elements based on the parsing;

in response to identifying when the transaction data is present, determining that the gift card value is available for processing the transaction for at least a portion of the transaction total;

determining an integration with the merchant that allows for purchasing of gift card values for the merchant at reduced payment amounts;

determining that the gift card value is available to be purchased for a reduced payment amount less than the at least the portion of the transaction total, wherein purchase of the gift card value at the reduced payment amount provides a full amount of the gift card value to the user for the transaction total after purchase; and providing, responsive to the request, a purchase option of the gift card value from in association with the checkout processing flow on the merchant website.

18. The non-transitory machine-readable medium of claim 17, wherein the operations further comprise:
receiving, via one of the application or the application operation, a request to purchase the gift card value;
processing a payment for the gift card value using an account of the user; and
applying the gift card value to the transaction for the transaction total.

19. The non-transitory machine-readable medium of claim 18, wherein the applying the gift card value is performed via the application operation without the user being required to provide payment information to the merchant website.

20. The non-transitory machine-readable medium of claim 17, wherein the webpage parsing script is utilized by at least one of a text monitor or a webpage field monitor for the application operation, and wherein the webpage parsing script is one of specific to the merchant website or universal to at least two different websites.

* * * * *

UNITED STATES PATENT AND TRADEMARK OFFICE
CERTIFICATE OF CORRECTION

PATENT NO. : 12,254,469 B2
APPLICATION NO. : 18/296323
DATED : March 18, 2025
INVENTOR(S) : Taylor Charles Ballenger, Konstantinos Sgoutas and Matthew Essenburg It is certified that error appears in the above-identified patent and that said Letters Patent is hereby corrected as shown below:

In the Claims

Claim 8, Column 22, Lines 31-32 change "wherein the calculated fee transaction comprises" to --wherein the calculated fee comprises--.

Signed and Sealed this
Twenty-ninth Day of April, 2025

Coke Morgan Stewart
*Acting Director of the United States Patent and Trademark Office*